United States Patent
Meempat et al.

(10) Patent No.: US 6,904,017 B1
(45) Date of Patent: Jun. 7, 2005

(54) METHOD AND APPARATUS TO PROVIDE CENTRALIZED CALL ADMISSION CONTROL AND LOAD BALANCING FOR A VOICE-OVER-IP NETWORK

(75) Inventors: Gopalakrishnan Meempat, East Brunswick, NJ (US); David J. Houck, Colts Neck, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/566,537

(22) Filed: May 8, 2000

(51) Int. Cl.[7] ................................................. H04J 1/16
(52) U.S. Cl. ...................... 370/238; 370/401; 370/252; 709/241; 709/242
(58) Field of Search .................... 370/395.21, 229–237, 370/238, 401, 252, 338, 354, 395.1, 395.43; 709/226, 238–242

(56) References Cited

U.S. PATENT DOCUMENTS

| | | | |
|---|---|---|---|
| 4,169,125 A | 9/1979 | Rodriguez et al. | |
| 4,761,268 A | 8/1988 | Andersen et al. | |
| 5,369,566 A | 11/1994 | Pfost et al. | |
| 5,737,498 A | 4/1998 | Murray | |
| 5,936,958 A * | 8/1999 | Soumiya et al. | 370/395.43 |
| 5,976,470 A | 11/1999 | Maiefski et al. | |
| 5,985,214 A | 11/1999 | Stylli et al. | |
| 6,063,339 A | 5/2000 | Tisone et al. | |
| 6,081,506 A | 6/2000 | Buyukkoc et al. | 370/235 |
| 6,155,123 A | 12/2000 | Bakalyar | |
| 6,275,470 B1 * | 8/2001 | Ricciulli | 370/238 |
| 6,463,062 B1 * | 10/2002 | Buyukkoc et al. | 370/395.1 |
| 6,590,867 B1 * | 7/2003 | Ash et al. | 370/236 |
| 6,597,689 B1 * | 7/2003 | Chiu et al. | 370/354 |
| 6,608,815 B1 * | 8/2003 | Huang et al. | 370/232 |

* cited by examiner

*Primary Examiner*—John Pezzlo

(57) ABSTRACT

An admission control and load balancing system controls admission of packet streams or calls to a network and balances the packet traffic across the network, improving quality of service. The system includes a central database which stores information including cost data associated with individual paths and links across the network. A processor, in communication with the database, coordinates the admission control and load balancing decisions, and updates of the database cost data to reflect the dynamic network conditions, based on input from appropriate data sources. In one embodiment, referred to as the exact algorithm, the database is consulted by the admission control points or gatekeepers prior to admitting each arriving packet stream, and the database contents are updated call-by-call to reflect the allocation of resources to each admitted stream. In another embodiment, referred to as the inexact algorithm, control decision as well as database updates occur on a periodic rather than on a call-by-call basis to promote better scalability. In this embodiment, the processor periodically calculates admission decisions based on cost data in the central database. These admission decisions are then periodically forwarded to a satellite database associated with each gatekeeper, for storage and use in admission decisions until the next update epoch.

18 Claims, 14 Drawing Sheets

VoIP NETWORK SCENARIO – EXACT APPROACH

36
CCDB – GENERAL CASE

EXACT ALGORITHM – CALL ARRIVAL

EXACT ALGORITHM – CALL DEPARTURE

VoIP NETWORK SCENARIO – INEXACT APPROACH

136
SATELLITE DATABASE – GENERAL CASE

INEXACT ALGORITHM

DETERMINISTIC VARIANT OF THE INEXACT ALGORITHM

PROBABILISTIC VARIANT OF THE INEXACT ALGORITHM

GATEKEEPER-INITIATED LINK UPDATES

ROUTER-INITIATED LINK UPDATES

336
CCDB – OSPF SPECIAL CASE

REDUCED EXACT ALGORITHM FOR OSPF

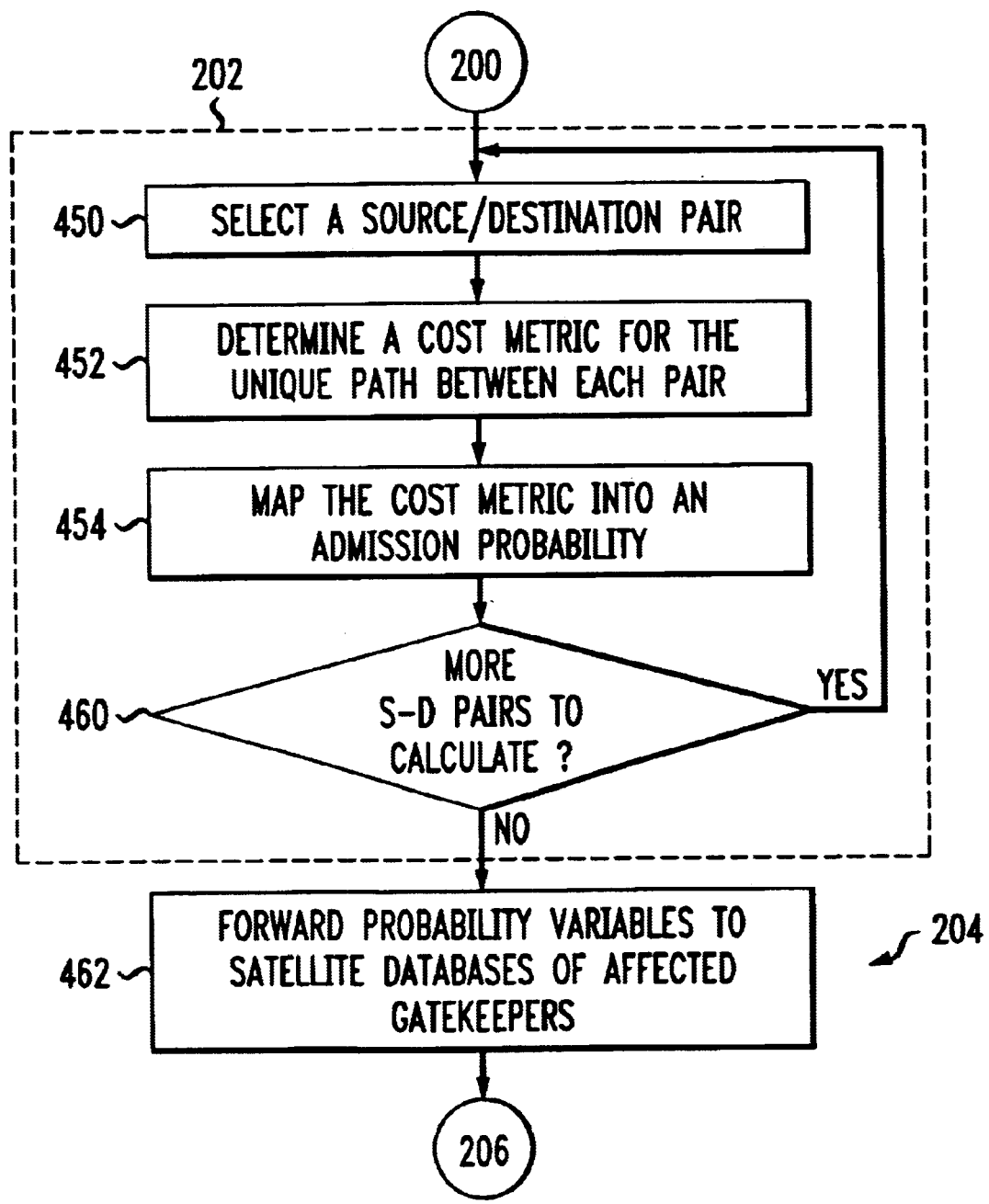

METHOD AND APPARATUS TO PROVIDE CENTRALIZED CALL ADMISSION CONTROL AND LOAD BALANCING FOR A VOICE-OVER-IP NETWORK

BACKGROUND OF THE INVENTION

The present invention relates to network communication systems. It finds particular application in conjunction with controlling admission of voice calls to a packet-based network, and efficiently selecting paths for admitted calls so as to balance the traffic load within the network. However, it is to be appreciated that the present invention is also amenable to other like applications such as video or real-time data, provided that they manifest in the form of "calls", where a need exists to improve the quality of service of data transfer over a packet network.

The internet, intranets, and other internet protocol (IP) networks are handling ever increasing volumes of data. Beyond the worldwide web and e-mail capabilities of such networks, applications and protocols are being developed to further add to the volume of traffic. Among these are voice related applications such as telephony or voice over IP, and video applications, such as video telephony, video conferencing, and the like. Unfortunately, even at current usage levels packet loss due to congestion is becoming problematic degrading the performance of data transfer.

Streams of packets typically enter the network from packet switching edge devices or gateways which serve as portals to the interconnected web of routers comprising the network. Typically these gateways are indiscriminant in their treatment of packet streams in that they merely port the packet streams onto the network without regard for congestion levels or likelihood of the packets reaching their final destination. Moreover, the networks typically are unaware of any, coherence or association among packet streams, and merely forward individual packets from router to router on a first-come-first-served basis, without regard to their relative priorities. These two limitations severely constrain the ability to provide quality-of-service guarantees for real-time services such as voice in IP-based networks.

Some attempts have been made to address portions of this problem. For example, packet prioritization schemes such as differentiated services or Diffserv distinguish packet streams among several classes. Protocols are also evolving which route higher priority packets more reliably, for example, by allocating certain bandwidth on links between routers for each class. Another partial solution that has been articulated is that of establishing explicit routing paths through the network between frequently traveled points. Multi-protocol label switching (MPLS) is a protocol which enables a label to be assigned to a packet stream which specifies a predetermined path through the network. This allows better monitoring and control of congestion over the paths taken by voice streams, for example. However, the problem introduced by the edge-devices not being aware of congestion levels within the interior of the network still remains. One strategy being pursued to tackle this limitation is to dedicate a certain amount of bandwidth for each MPLS path, on each network link that it traverses. This effectively creates a voice trunk between every pair of nodes, much akin to the telephone trunk routes currently employed between major call centers, and hence abandons the inherent flexibility afforded by the IP network. In particular, this strategy does not lead to a scalable solution. The number of trunks grows as the square of the number of nodes, and the consequent bandwidth fragmentation among hundreds or thousands of MPLS paths can exhaust the link capacities rather quickly. Furthermore, the servicing and provisioning of the multitude of voice trunks across the network are both cumbersome and slow to accommodate new nodes within the network.

The present invention contemplates a new and improved method and apparatus for voice-over-IP call management which overcomes the above-referenced problems and others associated with the existing approaches.

BRIEF SUMMARY OF THE INVENTION

The above problems are alleviated and an advance is made over the prior art in accordance with the teachings of applicants' invention wherein, a method of regulating admission of a packet stream to a network includes identifying a source and a destination gateway in response to receipt of a connection admission request. An optimal path between the gateways is then selected, and cost data associated with the path is compared to a threshold value. Based on the comparison the packet stream is selectively blocked.

In accordance with another aspect of the present invention, the method further includes at selected times, updating cost data associated with the network links, mapping the link costs to costs associated with the various paths, and storing the updated cost data.

In accordance with another aspect of the present invention, the updating cost step includes for each packet stream either admitted to or released from the path, adjusting the cost data associated with the links in the path to reflect the cost of the particular packet stream.

In accordance with another aspect of the present invention, each path includes a plurality of links interconnecting routers within the network. The updating cost data step includes measuring link usage at these routers.

In accordance with another aspect of the present invention, the path includes links adapted to discriminate between different classes of packet streams. The cost data step includes aggregating link use data based on a particular class associated with packet stream.

In accordance with another aspect of the present invention, the updating cost data step further includes tracking class-based link use data at an admission control point, for example, a gatekeeper (the entity that controls a group of voice gateways).

In accordance with another aspect of the present invention, the selectively blocking step includes blocking the packet stream based on a variable probability calculated as a function of cost data associated with the set of paths available between the source and destination gateways (by suitable mapping from the constituent links in the paths).

In accordance with another aspect of the present invention, a plurality of paths exists between the source and the destination gateways. The selectively blocking step includes blocking the packet stream when cost data associated with every one of the paths exceeds a threshold value.

In accordance with another embodiment of the present invention, a system for controlling admission of a packet stream to a network includes a database which stores information including cost data associated with various links and paths through the network. The system further provides a processor in communication with the database, where the processor coordinates cost data updates from a data source, such as routers or gatekeepers, to the database.

In accordance with another aspect of the present invention, the data source includes an admission control point (for example a gatekeeper) which controls packet stream entry to the network. The system further includes connections enabling communication between the admission control points and the processor.

In accordance with another aspect of the present invention, the data source includes a sampling probe associated with a router within the network. The system further includes connections enabling communication between the sampling probe and the processor.

In accordance with another aspect of the present invention, the processor calculates an admission decision for a path through the network. The system includes a second database accessible to an admission control point, where the processor forwards the calculated admission decision to the second database.

In accordance with another embodiment of the present invention, a method is provided which includes updating cost data for a path through a network at selected times. An admission decision for the path through the network is computed based on the cost data, and the admission decision is applied responsive to a packet stream (call) admission request.

In accordance with another aspect of the present invention, the computing step includes determining the minimum cost path between a source and a destination. The cost of the minimum cost path is compared to a threshold and based on the comparison a variable is set which indicates the result of the comparison.

In accordance with another aspect of the present invention, the computing step includes determining a cost factor for each path between a source and a destination in terms of the current costs associated with the constituent links. The method further includes determining a probability that a particular path will be selected, where the probability is based on the cost factor and individual cost data for each path. A variable is then set indicative of the determined probability.

In accordance with another aspect of the present invention, the updating cost data step includes adjusting cost data for the network links comprising the path upon each call admission and release.

In accordance with another aspect of the present invention, the computing step includes at a central location, computing an admission decision for at least one path through the network. The computed admission decision is then forwarded to a satellite location which enables decentralized admission control decisions.

In accordance with another aspect of the present invention, the network links include a plurality of links interconnecting routers within the network. The updating cost data step includes measuring link usage at the routers.

In accordance with another aspect of the present invention, the path includes links adapted to discriminate between classes of packet streams. The updating cost data step includes determining cost data by class.

In accordance with another aspect of the present invention, the updating cost data step further includes tracking path use data at an admission control point.

One advantage of the present invention resides in a scalable efficient method to enable improved quality of service for voice and other applications across a network.

Another advantage of the present invention resides in better bandwidth sharing compared against reserving bandwidth distinctly for each path. This results in efficient network utilization.

Still another advantage of the present invention resides in load balancing of packets across the network and providing overload protection capabilities without requiring modifications to existing standards.

Still further advantages and benefits of the present invention will become apparent to those of ordinary skill in the art upon reading and understanding the following detailed description of the preferred embodiments.

BRIEF DESCRIPTION OF THE DRAWINGS

The invention may take form in various components and arrangements of components, and in various steps and arrangements of steps. The drawings are only for purposes of illustrating the preferred embodiments, and are not to be construed as limiting the invention.

DETAILED DESCRIPTION OF THE PREFERRED EMBODIMENTS

The discussion that follows will address the general case, where a set of alternate spatially diverse MPLS explicit paths is assumed to be set up between each pair of source and destination edge nodes. The plurality of paths between a given pair of edge nodes allows the load balancing capability embodied in the present invention. However, unlike the MPLS trunking approach mentioned earlier, there is no per-path bandwidth reservation in our model. As will be explained later, voice bandwidth reservation on each network link is done here on an aggregate basis for all the MPLS paths carrying voice on the link. A mechanism such as Diffserv is used for this purpose, independently of MPLS. Thus our solution is not affected by the scaling concerns that pertain to the trunking approach as observed earlier. Note that the admission control feature of the proposed scheme can also be implemented in conjunction with the special case based on the conventional OSPF routing instead of MPLS. However, the load balancing feature is not available with this case since there is no flexibility to set up multiple explicit paths among a given pair of edge nodes. The modifications in the overall scheme to effectuate this latter variant will be highlighted below where appropriate.

Figure 1:
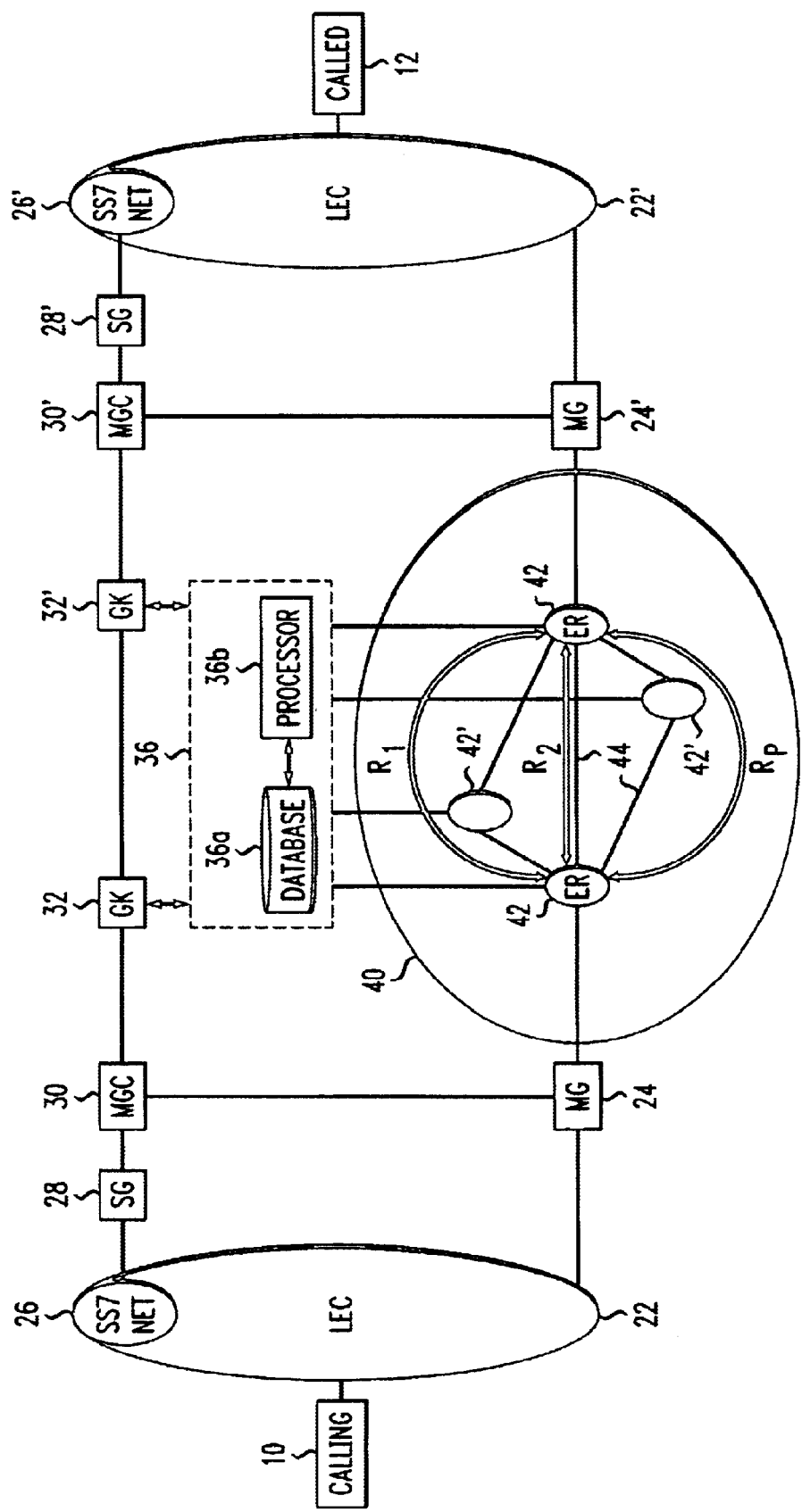
FIG. 1 is a simplified illustration of a voice-over-IP network suitably adapted to practice the present invention.

We shall use an H.323-based Voice-over-IP 2-stage call model as a vehicle to describe the invention. The principles of the invention are however not to be construed as being tied to this protocol or the sequence of steps described below. It can be implemented with equal ease in conjunction with any of the competing protocol standards available to support Voice-over-IP call management. With reference to FIG. 1, a voice-over-IP (VOIP) call is initiated by a calling party 10 wanting to establish a call to the called party 12. Once the calling party 10 has dialed the local number for the originating media gateway 24 (MG), the LEC end office 22 (originating EO) selects the particular DS0 channel to the originating media gateway 24 (MG) to place -the call on and forwards the information to a Signaling System 7 (SS7) network 26. The SS7 network 26, in urn, sends an ISUP IAM message to the signaling gateway 28 (SG), identifying the local number being called and the DS0 channel to be used.

SG 28 selects the media gateway controller 30 (MGC) to handle the call and sends a "setup" message to MGC 30. MGC 30 sends a "connect" message to MG 24 indicating the call parameters, and MG 24 responds and provides its own IP address. MG 24 then prompts the calling party 10 to enter the destination number, which is sent to MGC 30. MGC 30 sends an "admission request" to a local gatekeeper 32 (GK), indicating the IP address of the calling MG 24 and destination phone number.

GK 32 queries a LNP database (not shown) to identify the destination LEC 22' and hence the domain gatekeeper 32' that handles the dialed number, and sends a setup message to GK 32'. First, GK 32' queries a local routing database (not shown) to locate an available media gateway 24' that can terminate the called number; it also obtains the IP address of this gateway. The remaining steps of the H.323 call flow described below are specialized to support the present invention. Nevertheless, it is again emphasized that analogous entities and procedures may be readily identified for the invention to operate in conjunction with any of the competing protocol alternatives, rather than H.323.

GK 32' next sends a path query message to a Call Admission Control and Load Balancing agent 36, identifying both the source and destination media gateways 24, 24' and the amount of bandwidth required (except if all calls consume a fixed, known bandwidth). Those skilled in the art will appreciate that the gateway identification can be made, for example, by using IP addresses, or more efficiently, some VoIP-specific codes. In the illustrated embodiment, the agent comprises a database 36a and a processor 36b, collectively referred to as the Call Control Database (CCDB).

The CCDB 36 determines a most favored path (an MPLS path) from the set of alternatives $R_1, R_2, \ldots R_p$ available in the forward direction and the one in the reverse direction through a network 40. The procedures for path selection will be explained in greater detail below. Once the CCDB 36 establishes (as per one of the procedures to be described) that sufficient bandwidth exists on both the forward and return paths to carry the new call, the corresponding MPLS path identifiers are returned to GK 32'. If, on the other hand, it is determined that the available bandwidth is insufficient on at least one of the selected forward and reverse paths, a "call reject" message is communicated to GK 32'.

If GK 32' receives a "call reject" message it is relayed to GK 32, which in turn initiates procedures to block and clear the call at the caller's end. Otherwise, GK 32' sends a "connect" message to the destination media gateway controller 30' including the IP addresses of the caller MG 24 and the called MG 24', the MPLS path identifiers in the forward and reverse directions, and the called number.

MGC 30' in turn sends a "connect" message to MG 24' including the identity of the reverse MPLS path and the IP address of the caller MG 24. Next, MGC 30' sends a request including the destination telephone number to SG 28' to set up a circuit switched path segment across the terminating LEC EO 22', between MG 24' and the called number 12. MGC 30' also sends an "alerting" message to the caller MGC 30, which includes the IP address of the terminating gateway MG 24' as well as the forward MPLS path identifier provided by GK 32'. MGC 30 passes the IP address and MPLS path identifier to MG 24 and also instructs MG 24 to generate ringing.

Once SG 28' receives confirmation for the path setup across the destination LEC EO 22', it sends a "connect" message to MGC 30', which is relayed to MGC 30. MGC 30 then requests MG 24 to provide call progress tone to the caller. The connection is now established and both the forward and reverse voice paths are available end-to-end.

When a call terminates, the gatekeeper GK 32' alerts the CCDB 36 of this change and appropriate database updates are performed indicating the release of bandwidth and hence the extra capacity available on the paths. Further details on the setup and termination processes not directly germane to this discussion can be found for example in ITU-T Recommendation H.323—"Packet-based multimedia communication systems".

As discussed above, the CCDB 36 tracks network usage and provides a mechanism for voice gatekeepers to determine the status of the network 40. There are many database designs that capture the necessary information of the CCDB. We illustrate in FIG. 2 one such design. that captures the generic structure of the database portion 36a of the CCDB. It is generic in that it incorporates a superset of the data structures needed by the different variants of the call admission control and load balancing algorithm to be presented. As will become apparent to those skilled in the art, certain data items or fields are irrelevant in specific embodiments and hence may be eliminated or not populated.

Figure 2:
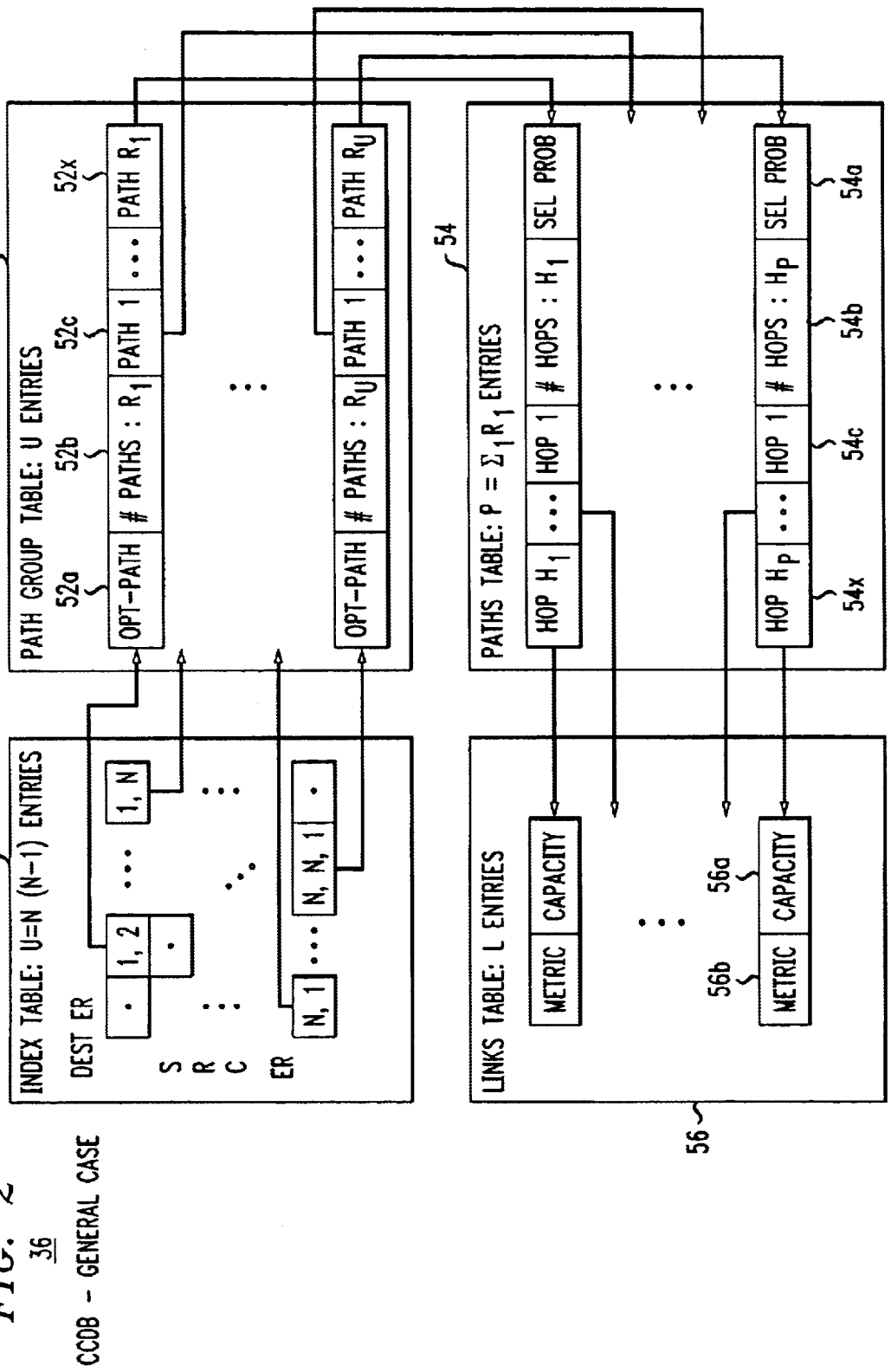
FIG. 2 is an illustration of a generic set of data tables within the database of FIG. 1.

We will first describe the generic case using MPLS explicit routes (with path diversity among pairs of edge nodes); the special case involving OSPF routing will be addressed subsequently. The database portion of the CCDB 36a is comprised of four tables with a linked list arrangement as shown in FIG. 2. To understand this structure, consider a network comprised of N edge routers 42 (ER) and L IP links 44. Note that multiple voice gateways would typically connect to each edge router. However, the voice MPLS paths are set up among pairs of edge-routers rather than among pairs of gateways so as to improve scalability.

To simplify the discussion, all calls from a given source edge router 42 to a given destination edge router 42 are treated in an identical manner, without regard to the specific gateways at which they originate or terminate. Resolution of the voice packet streams among the specific voice gateways that home on to the same edge router can be done in a number of ways, as will be apparent to those skilled in the art. One strategy is to use the (unique) IP addresses of the gateways to effectuate proper packet forwarding between the edge routers and gateways, while routing across the network is via MPLS, using the forward and reverse paths identified by the admission control algorithm presented here for the pair of edge routers in question.

Typically, the forward and reverse paths of a voice connection in an IP network 40 are independent, with each potentially traversing entirely different physical segments. As is clear, the network 40 has a total of U=N(N−1) potential source-destination edge router pairs. To establish a voice call between any given pair, two circuits should be setup, one in each direction.

For each source-destination pair i (i∈1, . . . , U), a total of $R_i$ independent explicit MPLS paths are set up from the source edge router s(i) to the destination edge router d(i). Thus, there are a total of $P=\Sigma_{i=1}^{U} R_i$ distinguishable MPLS paths within the network domain 40 altogether. These physical paths are established a-priori by a network management system with maximal spatial diversity, so as to promote better reliability and load balancing. However, as mentioned earlier, no bandwidth is dedicated to any particular path; bandwidth reservation is done on each link on an aggregate basis to be shared by all MPLS paths carrying voice.

Each MPLS path within the network 40 is assigned a unique path index number (PIN) (e.g. PIN∈1, . . . ,P). To the extent that the PIN's are used to exchange the identities of specific MPLS paths, a common understanding among system components (i.e. the CCDB 36, the gatekeepers 32 and the voice gateways 24) is used to uniquely identify these paths. In particular, the CCDB 36 may convey the identity of a selected path in terms of its PIN, and the source edge router 42/gateway 24 can translate this PIN into the appropriate outgoing MPLS tag. In an analogous manner, each edge-router 42 that connects to one or more voice gateways 24 is assigned a unique node index number (NIN), again, with a common understanding among the gatekeepers 32 and CCDB 36. Use of VoIP-specific index numbers (e.g. PIN and NIN) for the MPLS paths and edge routers (instead of their IP addresses). as described above allows direct array indexing operations in the algorithms to be presented. This reduces the need for character string matching, and thus facilitates fast and simple implementation.

As seen in FIG. 2, the four tables in CCDB 36 are referred to as INDEX table 50, PATH GROUP table 52, PATHS table 54 and LINKS table 56. The INDEX table 50 is a two-dimensional array that can be directly addressed by the indices (NIN's) of a given source node and destination node. Each entry in this table provides the array index of a specific entry (row) in the PATH GROUP table 52 (which has a total of U entries). The second field 52b of each entry i in the PATH GROUP table 52 indicates $R_i$, or the number of alternative MPLS paths available from source node s(i) to destination node d(i). Fields 3 through $R_i$+2 ($52c$–$52_x$) store the PIN's of these specific MPLS paths, which are also identical to the array indices of the corresponding entries in the PATHS table 54. The first field 52a of row i in the PATH GROUP table 52, referred to as "Opt-path", indicates the PIN of the optimal MPLS path (from among the $R_i$ alternatives) that should be used to carry the voice packet stream from s(i) to d(i), if the next call arrival between these two nodes is to be admitted.

In selected embodiments to be more fully developed below, a negative number stored in the "Opt-path" field 52a is understood to signify that all of the $R_i$ paths from s(i) to d(i) are currently blocked. Note that this field is used only by certain versions of the call admission control and load balancing algorithm to be presented below; it is ignored (or eliminated) in other embodiments.

The PATHS table 54 has a total of $P=\Sigma_{i=1}^{U} R_i$ entries (rows), one corresponding to each MPLS path within the network domain, and indexed by the PIN's. The second field 54b of each entry j in the PATHS table 54 provides the number of hops $H_j$ in the MPLS path with PIN j. Fields 3, . . . , $H_j$+2 (54c–54x) provide the indices of the entries (rows) in the LINKS table 56 which store information pertaining to the links in the path with PIN j. The first field 54a of entry j in the PATHS table stores a number between 0 and 1.0. This number indicates the probability of assigning the path with PIN j to carry the voice packet stream from the corresponding source node to the destination node, should the next call arrival between these nodes be admitted. For a given source and destination, the sum of the selection probabilities for the corresponding $R_i$ MPLS paths can be less than 1.0 in which case the residual amount signifies the probability that none of these paths is selected hence blocking the call in one direction. As above, the probability field is used only by certain embodiments described below; it is ignored (or eliminated) in others.

Each of the L entries in the LINKS table 56 has two fields, the first one 56a indicates the capacity reserved for voice on the link in question, and the second one 56b stores a current status metric (e.g., percent utilization or unused bandwidth) used in call admission control and load balancing decisions.

The INDEX, PATH GROUP and PATHS tables 50, 52, 54 together provide a record of the exact sequence of links traversed by each of the alternate paths set up across the IP network between every pair of edge nodes. The LINKS table 56 provides (i) the capacity 56a allocated for voice on each network link and (ii) a metric 56b reflecting the current voice occupancy status of that link. The data stored in the four tables comprise the information needed to make call admission control and load balancing decisions.

The INDEX table 50, the PATH GROUP table 52 except for the "Opt-path" column 52a, the PATHS table 54 except for the "Sel-prob" column 54a, and the "Capacity" column 56b of the LINKS table 56, are populated in advance. This may be done either by human operator, or the CCDB 36 may have the capability to program these tables in response to messages containing routing and bandwidth reservation information sent by higher level control functions that actually set up the MPLS paths and assign priority weighting at the nodes 42. In fact, these configurations may be re-programmed periodically to "tune" to major shifts in the traffic pattern, albeit on a time scale much slower than that of the real-time call admission control and load balancing functions. On the other hand, the "Opt-path" column 52a of the PATH GROUP table 52 and the "Sel-prob" column 54a of the PATHS table 54, and the "Metric" column 56a of the LINKS table 56, are dynamically updated to reflect real-time link and path status. This is accomplished either by update messages from the Gatekeepers 32, in one embodiment known as the accounting-based approach, or by traffic measurement reports sent by the IP routers 42, in another embodiment known as the measurement-based approach.

Figure 3:
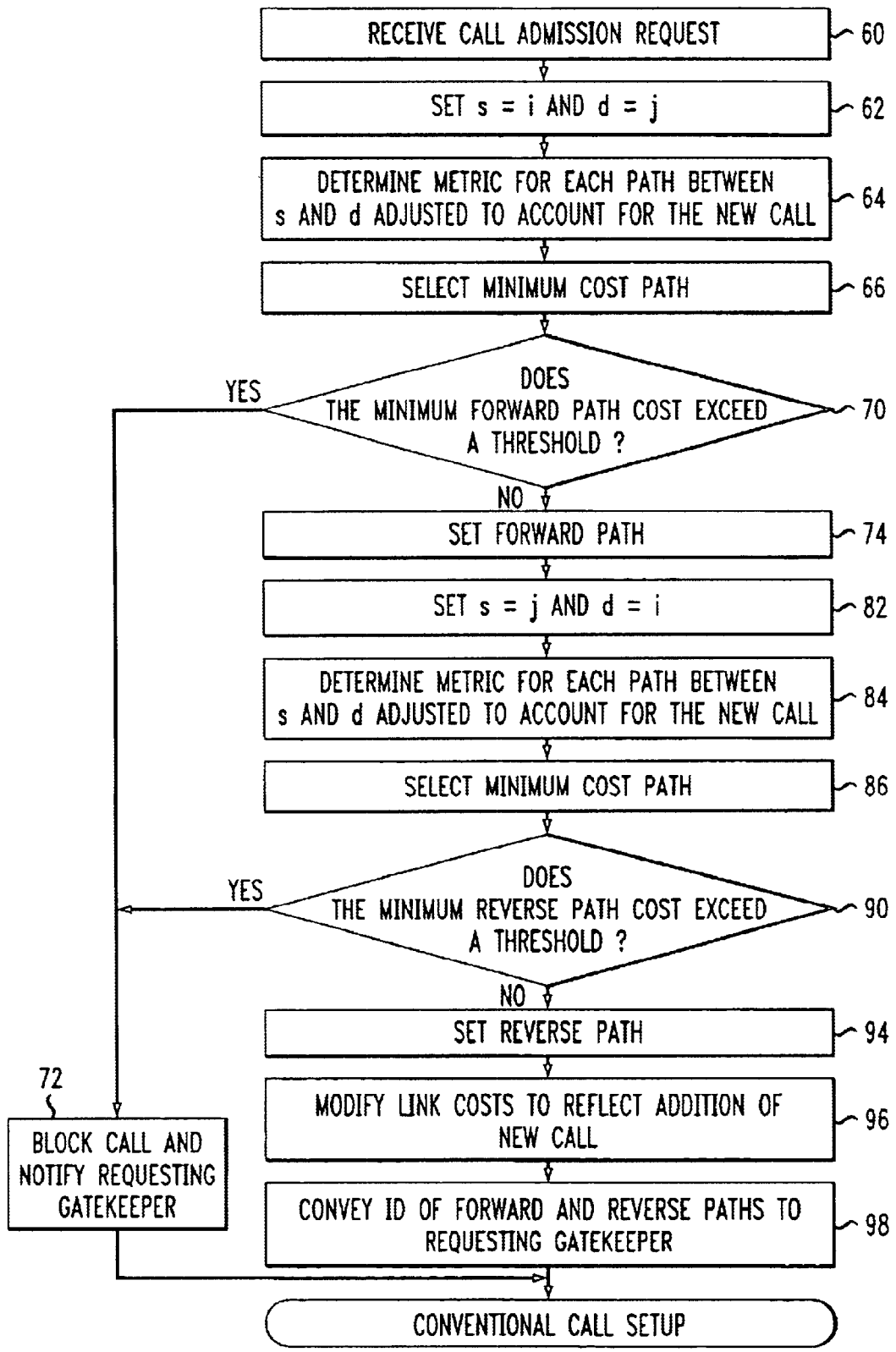
FIG. 3 is a flowchart describing one major function of an embodiment of the present invention based on an exact strategy.
Figure 4:
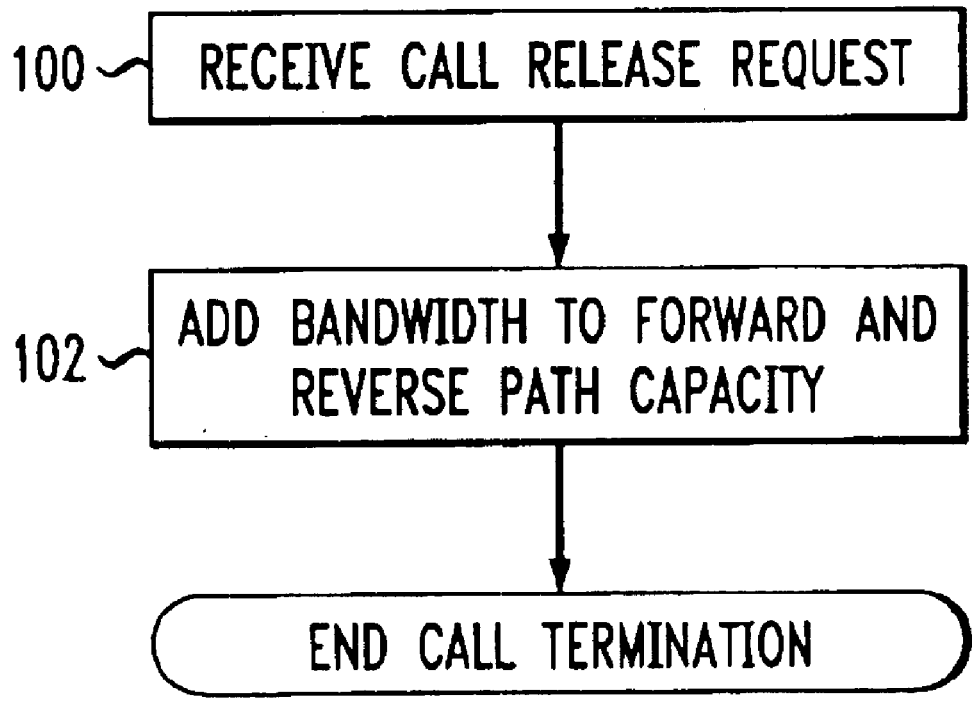
FIG. 4 is a flowchart describing another major function of the embodiment based on the exact strategy.

With reference now to FIGS. 3 and 4, a specific algorithm for centralized VOIP call admission control and load balancing is shown based on the framework described above. It operates on per-call updates and decision making performed at the CCDB 36 (FIG. 1). Henceforth referred to as the exact algorithm, this is an accounting-based approach and all the control capabilities are fully centralized within the CCDB 36. It offers the advantage of being precise in the sense that it can match the level of QoS assurance and bandwidth efficiency attainable in TDM networks.

Accounting-based call management is preferably implemented assuming two general principles:
There is a distinct voice sub-network by virtue of a prioritization scheme such as Diffserv or the like.
The gatekeepers 32 are collectively cognizant of the state of this sub-network, or can access data relating thereto by aggregating information at a central location such as the CCDB 36.

Note that the "Opt-path" column 52a of the PATH GROUP table 52 and the "Sel-prob" column 54a of the PATHS table 54 (FIG. 2) are not used by the exact algorithm, and may be eliminated. The description of the exact algorithm below will envisage link occupancy metering in terms of link utilization, but those skilled in the art can appreciate that the algorithm could easily be converted to measure link occupancy in terms of other suitable criteria such as the unused bandwidth. Accordingly, the Metric field 56b of entry 1 in the LINKS table 56 in CCDB 36 (FIG. 2) provides the most recent estimate of the percentage utilization of the capacity available for voice on link 1. The exact minmax algorithm has two components, one corresponding to call arrival (FIG. 3) and the other corresponding to call departure (FIG. 4). These are described below.

The admission control and load balancing function shown in FIG. 3 begins with a gatekeeper 32 requesting to admit a call of bandwidth B between a pair of edge nodes i, and j as shown in step 60. The CCDB 36 then determines availability of a forward path through the network 40 by setting the source edge node 42 as i and the destination edge node 42 as j, in step 62. For each path r from among the $R_{sd}$ choices available for the source-destination pair (s, d), as indicated by the INDEX table 50 and the PATH GROUP table 52, the CCDB 36 determines util (r)=Max{[Metric (l)+B/Capacity (l)]; l∈set of links in path r as indicated by the PATHS table 54 and LINKS table 56}. In other words, in step 64, the CCDB 36 assigns a cost to each path between the source and destination equivalent to the maximum of the costs associated with the set of links that it is comprised of. By adding B/Capacity(l) to Metric(l), the path cost computation step accounts for the effect the new call would have on the link utilizations, should it be admitted on the path. The path cost thus equals the link cost of the bottleneck link, with the impact of the new call accounted for. It is to be understood that "cost" as used here is a measure of the degree to which a link 44 or path is loaded. As an example, we employ percentage utilizations of network link capacities to specify their associated costs. This notion of cost is readily distinguishable to those skilled in the art, from the more common use of the term "cost" in reference to financial considerations. After computing the path costs the processor 36b selects the minimum cost path k such that util (k)≦util (r) for every path r from the source node s to the destination node d, as illustrated in step 66. This completes the "load balancing" portion of the decision in the forward direction.

After identifying the smallest cost path, the CCDB 36 determines if the minimum path cost exceeds a utilization threshold in step 70, where the threshold indicates the point at which new calls should not be accepted on any link. If the minimum path cost is too high, the CCDB generates and forwards a BLOCK signal to the requesting gatekeeper 32, as seen in step 72. On the other hand, if the threshold is not exceeded, the CCDB sets the minimum cost path selected as the forward path, step 74. This completes the "admission control" portion of the decision in the forward direction.

In IP networks, availability and optimality of a bandwidth guaranteed forward path does not in general imply the availability or optimality of one in the reverse direction. In particular, as noted earlier, the forward and reverse paths could even traverse different sets of nodes and links. Continued reference to FIG. 3 illustrates the determination of the reverse path by first reversing the source node and destination node, indicated by step 82. Steps 84, 86 and 90 illustrate selection of a minimum cost path and a threshold comparison substantially similar to the above described steps 64, 66 and 70. If a suitable reverse path could not be identified, the gatekeeper 32 is notified with a BLOCK signal as in the case of the earlier decision in the forward direction. In the event that neither the forward path nor the reverse path exceed the threshold, the decrease in bandwidth available on the links 44 comprising these two paths due to the call about to be admitted is reflected in the stored cost metrics 56b as shown in step 96. We presently employ the percentage utilization of the voice capacity on each link as its cost metric. Accordingly B/Capacity(l) is added to Metric(l) (FIG. 2, 56b), for each link 1 on the forward path as well as on the reverse path, as indicated by the PATHS and LINKS tables 54, 56. At this point in the algorithm, the paths have been selected and metrics for the links to be used have been adjusted. The PIN's of the forward and reverse voice paths are conveyed to the requesting gatekeeper 32, to be used to set up the call, as illustrated in step 98.

FIG. 4 illustrates the procedures to reclaim the allocated bandwidth upon termination of a call. A gatekeeper 32 submits a request to release a call of bandwidth B that had occupied an MPLS path in the forward direction, and an MPLS path in the reverse direction as seen in step 100. CCDB 36 then subtracts B/Capacity(l) from Metric(l) for each link 1 of the forward path and the reverse path, as indicated by the PATHS and LINKS tables 54, 56 and depicted in step 102.

Per-call updates and decision making, as used in the above algorithm, can potentially impose relatively high processor as well as communication overhead; for example, the gatekeepers 32 will need to communicate with CCDB 36 and the latter will need to execute the procedures described, on a per-call basis. Hence, several alternate, less exact, algorithms are also provided. The first inexact alternative that we will present also has an accounting-based flavor. However, database updates as well as decision making are now performed on a periodic rather than on a per-call basis. This leads to significant reductions in call processor and signaling overhead, but runs the risk of occasional QoS violations and bandwidth inefficiency. The former drawback can be overcome at the cost of maintaining adequate guard bands (safety margins) on network links; this will translate into added bandwidth overhead. Apart from the accounting-based inexact algorithm, we shall also present a measurement-based inexact algorithm which is similar, with the exception that database updates are based on real-time traffic measurement reports sent by the IP routers 42 rather than on call counts sent by the gatekeepers 32.

Figure 5:
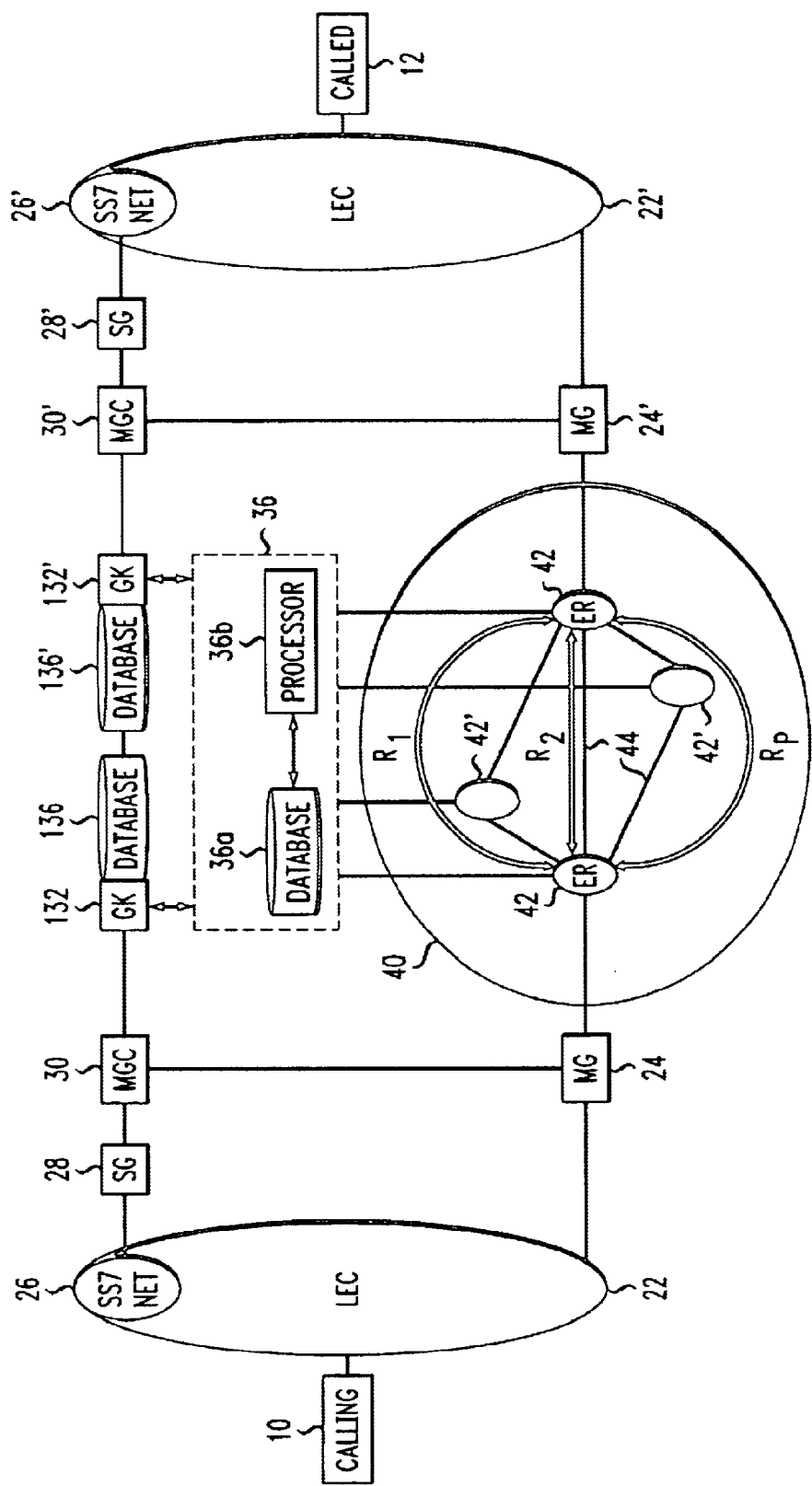
FIG. 5 is an illustration of another embodiment of a network suitably adapted to practice the present invention.
Figure 6:
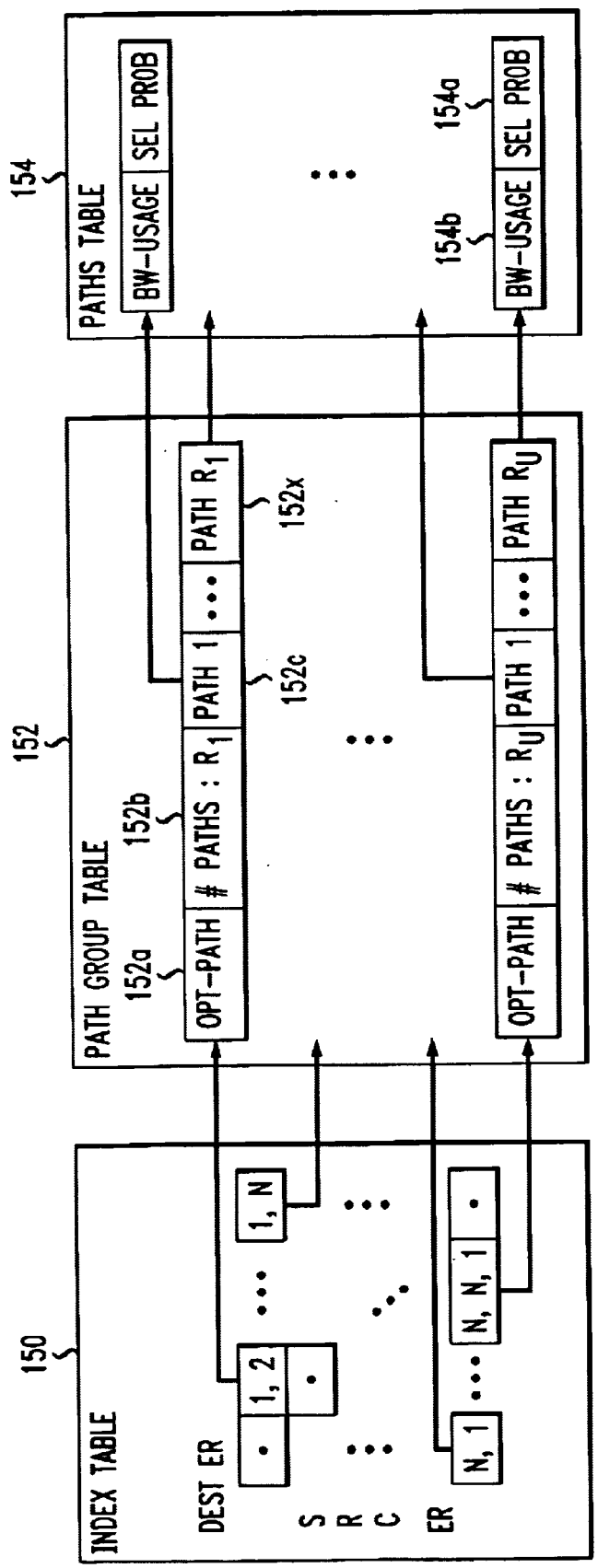
FIG. 6 is an illustration of one embodiment of the data tables within the satellite databases of FIG. 5.

FIG. 5 illustrates a system employing a modified gatekeeper 132 used to reduce interactions between CCDB 36 and the gatekeepers 32. Accordingly, each modified gatekeeper 132 is retrofitted with certain data structures, referred to as satellite control databases 136. A generic structure of the satellite database 136 that applies to all the different variants of the inexact algorithms to be described below is depicted in FIG. 6. Again, certain components of these data structures may not apply to certain variants and may be eliminated or left unpopulated as appropriate.

Referring now to FIG. 6, the basic structure of the satellite database 136 is similar in many respects to that of the CCDB 36 (FIG. 2). The main differences are (a) the LINKS table 56 (FIG. 2) is absent in the satellite database 136, and (b) the PATHS table 154 has only two columns, a path selection probability column 154a (similar to the Sel-prob column 54a in FIG. 2), and a "local" bandwidth usage column 154b for each MPLS path. The number of entries within the satellite database 136 is considerably smaller than in the CCDB 36. In particular, if there are K gatekeepers 132 within the network administration domain, each gatekeeper database 136 tracks, on the average, only N(N−1)/K source-destination node pairs. In the interest of minimizing the processing load, the same array indexing structure (in terms of PIN's and NIN's) as used in CCDB 36 is employed in the satellite databases 136 as well. As noted earlier, direct array manipulations avoid the need for string matching operations, and thereby lead to faster and simpler implementation.

Figure 7:
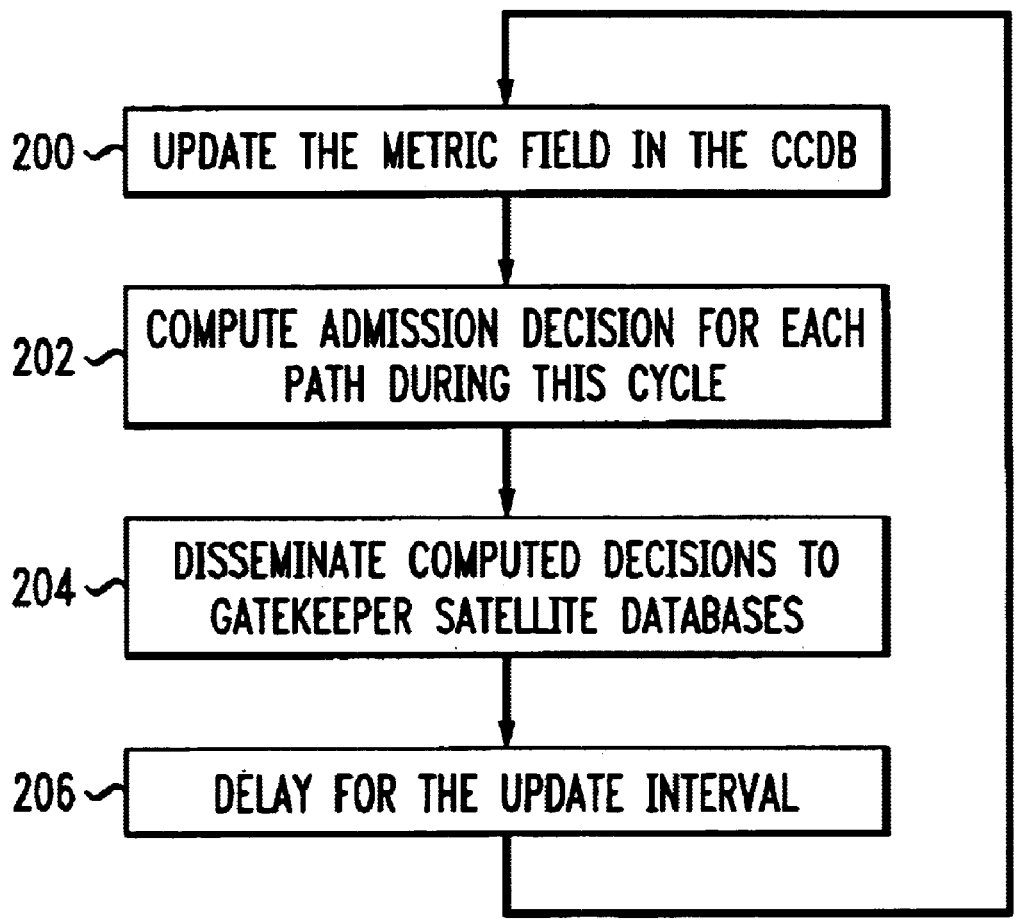
FIG. 7 is a generic flowchart for another embodiment of the present invention, based on an inexact strategy.

FIG. 7 shows a generic inexact algorithm, as opposed to the exact algorithm discussed above (FIGS. 3 and 4). It is centered on the notion of a sequence of steps executed repeatedly after a pre-determined interval referred to as the update interval. During each such cycle, the processor 36a first updates the Metric field column 56b of the LINKS table 56 in the CCDB 36, seen in step 200. As more fully developed below, this is alternately accomplished either by messages initiated by gatekeepers 132 (i.e., accounting based) or by traffic measurement reports from the IP routers 42 (i.e., measurement-based). The processor 36a then computes the admission control and load balancing decisions exhaustively for all source-destination node pairs within the administrative domain, to be used by the gatekeepers 132 until the next update epoch, seen in step 202. As will be more fully developed below, there can be a deterministic and a probabilistic variant of the control decisions. The processor 36a disseminates the computed control decisions to the gatekeepers 132, for storage in the satellite databases 136, as seen in step 204. For each new call arrival to a gatekeeper 132, the locally stored control decisions are executed until the next update is received. The process cycles periodically according to the determined update interval, as seen in step 206.

Focusing on steps 202, 204, since they do not depend on the specific form of link metric update (i.e., whether accounting-based or measurement-based), there are two variants of the control decisions that may be used, namely, a deterministic variant and a probabilistic variant. These are described below.

Figure 8:
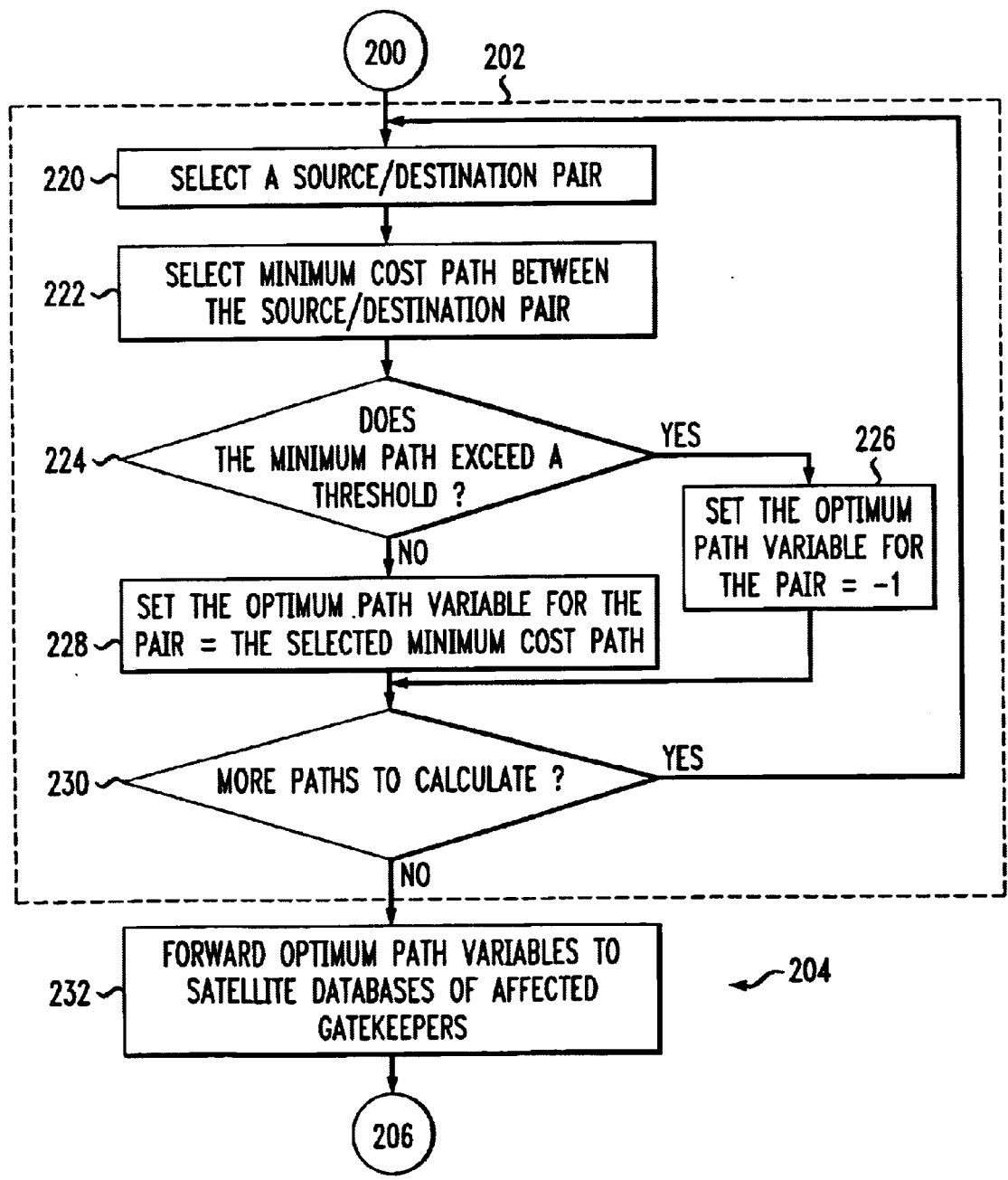
FIG. 8 is a flowchart detailing one embodiment of FIG. 7.

A. Deterministic Form of Control:

Referring to FIG. 8, with deterministic control each gatekeeper 132 either assigns a fixed path for all call originations between each source-destination pair that it handles, or blocks all calls between them, for the duration of the current update cycle. The deterministic variant uses the Opt-path column 52a of the PATH GROUP table 52 (FIG. 2) within the CCDB 36 and the Opt-path columns 152a of the PATH GROUP tables 152 (FIG. 6) in the satellite databases 136. However, the Sel-prob column 54a of the PATHS table 54 (FIG. 2) in the CCDB 36 and the Sel-prob columns 154a of the PATHS tables 154 (FIG. 6) in the satellite databases 136 are not used; hence these may be eliminated. Following the LINKS table 56 update during each update cycle, step 200, the CCDB 36 computes the "optimal" paths to be used by all the source-destination pairs in the administrative domain, based on the current link status information. These optimal paths are then stored in the "Opt-path" fields 52a in the PATH GROUP table 52 (FIG. 2). Also, if all paths are blocked between a given pair of source and destination edge routers 42, a negative number is stored in the respective "Opt-path" field 52a. These steps are taken in the following manner, which is a simplified version of the algorithm described earlier for the exact scheme.

Select a source-destination pair, (s, d), s, d∈1, ..., N; s≠d, as seen in step 220. For each path r from among the $R_{sd}$ choices available for the source-destination pair (s, d), as indicated by the INDEX 50 and PATH GROUP 52 tables, determine util(r)=Max{Metric(l); l∈set of links in path r as indicated by the PATHS 54 and LINKS 56 tables}. In other words, for each path between the source-destination pair, set a path utilization metric equal to the link metric of its bottleneck link. However, unlike with the exact approach, the bandwidth of an individual incoming call is not factored into the metric computation. Next, the minimum cost path k is selected such that util(k)≤util(r) for every path r from source node s to destination node d, as seen in step 222. Next, a comparison is made as to whether the minimum path cost util(k)≥$U_{max}$, the maximum threshold on allowable utilization. If so Opt-path(INDEX(s, d)) is set to −1, as seen in step 226, otherwise Opt-path(INDEX(s, d)) is set to k, as seen in step 228. In the case of the inexact algorithm, the threshold $U_{max}$ attains added significance as the guardband that needs to be maintained on the link capacities to protect against potential Qos violations introduced by the inexactness of the approach. Depending on the duration of the update interval, this may have to be set sufficiently large; in contrast, the value of $U_{max}$ can be very small in the case of the exact scheme, since the control database is updated on a call-by-call basis. The above steps are repeated until the optimum paths (or blocked status) are computed for all valid source-destination node pairs.

Finally, as seen in step 204 (FIG. 7) above, CCDB 36 sends the decision variables in a set of messages to the gatekeepers 132. The decision update message sent to each gatekeeper 132 includes {(i, j, Opt-path), (j, i, Opt-path)}, where i=1, ..., N; j∈the set of edge routers 42 each of which interfaces with one or more voice gateways 24 that are managed by the gatekeeper 132 in question. Upon receipt of the decision update message, each gatekeeper 132 copies each received data item (i, j, Opt-path) into the corresponding local Opt-path variable 152a in its satellite database 152 by following the link provided by INDEX(i,j) in table 150. Until the next decision update message is received from CCDB 36, the gatekeeper 132 locally looks up the Opt-path field 152a upon each new call arrival between a given source-destination pair. If a negative value is indicated, all paths are understood to be blocked and the call is not admitted, else the path with PIN equal to the alue stored in Opt-path 152a is assigned.

B. Probabilistic Form of Control:

In this embodiment, each gatekeeper 132 stores a probability with which it is expected to select each of the available MPLS paths between a given pair of source and destination edge routers 42, for the duration of the current update cycle. In other words, for each source-destination pair (s, d) which has RSd available MPLS paths, the applicable gatekeepers 132 are provided with a set of fractions $p_1, \ldots, p_{Rsd}$. While processing each new call arrival, a gatekeeper 132 would select path i with probability $p_i$, and block the call with probability $1-\Sigma p_j$. Note that this model requires each gatekeeper 132 to have the capability to select a path (or to reject the call) with a specified probability, based on suitable generalized round-robin algorithms. This strategy offers the potential to allow a more graceful and even distribution of the load, particularly when the update intervals are not small enough.

The probabilistic approach uses the "Sel-prob" column 54a of the PATHS table 54 within CCDB 36 and the "Sel-prob" columns 154a of the PATHS tables 154 within the satellite databases 136. However, the "Opt-path" columns 52a, 152a of the PATH GROUP tables are not used, and may be eliminated. Following the LINKS table 56 update during each update interval, the CCDB 36 computes the admission decisions 202 (FIG. 7), in this case a selection probability associated with every path within the administrative domain. As above, this decision is based on the current link status information, the origin of which will be more thoroughly discussed below.

Figure 9:
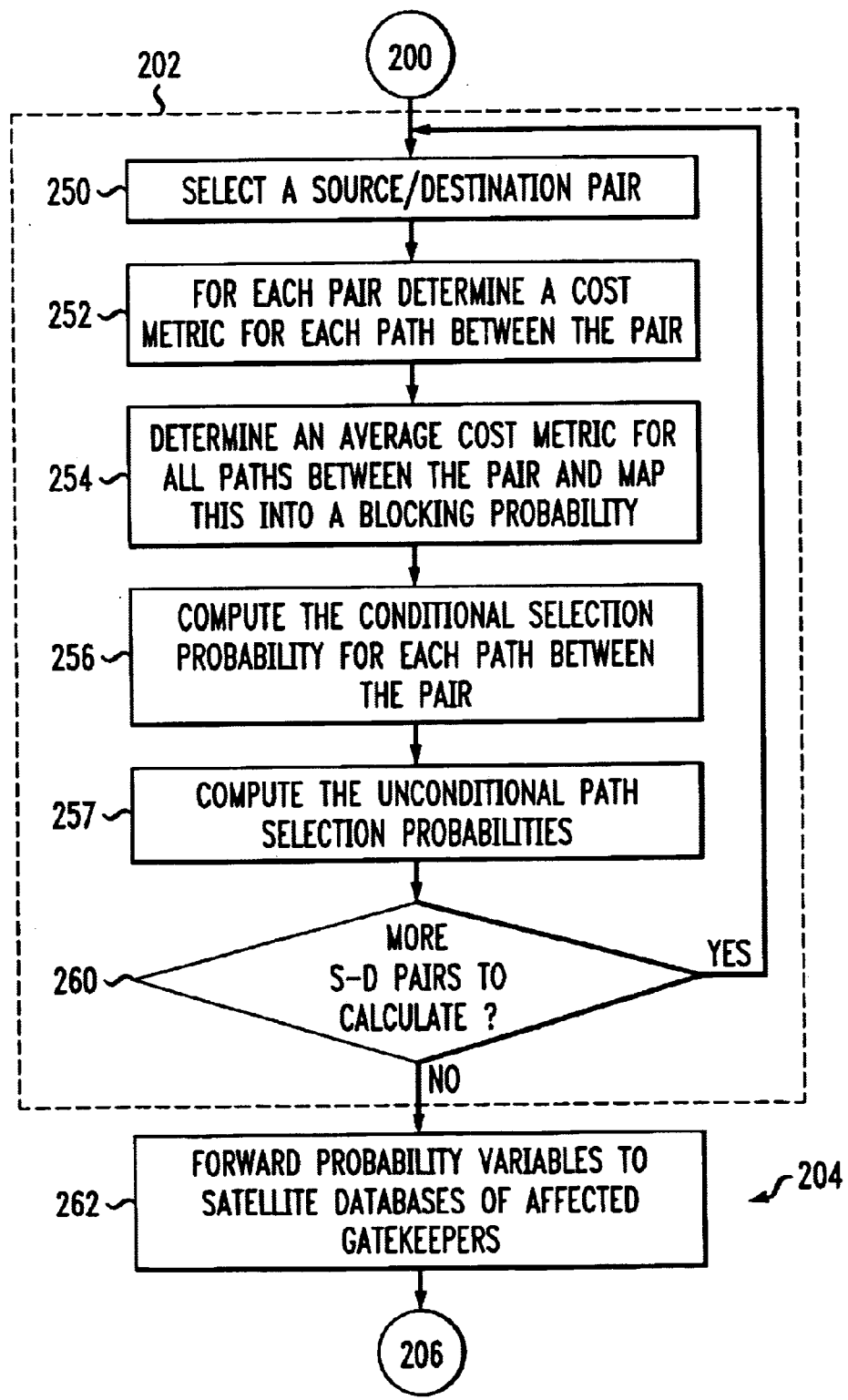
FIG. 9 is a flowchart detailing another embodiment of FIG. 7.

Reference to FIG. 9 depicts a relatively simple, exemplary embodiment, for the sake of illustrating the computation of the admission decisions. The processor 36b selects a source and destination pair of end nodes 42, as seen in step 250. For each path r from among the $R_{sd}$ available choices between source s and destination d (where s, d∈1, . . . , N; s≠d, and N is the number of edge nodes 42), the processor 36b determines a path utilization metric $U_r$=Max{Metric(l); l∈set of links in path r as indicated by the PATHS and LINKS tables 54, 56}. In other words, the processor 36b sets each path utilization equal to the utilization associated with its bottleneck link as in the previous embodiments; this is indicated in step 252. Processor 36b next computes two sets of parameters: (a) the probability of blocking the call as a function of the average utilization of the $R_{sd}$ available paths between source s and destination d, and (b) the conditional probability of selecting each path r, should a decision be made to admit an incoming call. For computing the blocking probability, the processor 36b first calculates $U_{avg}$, the average utilization of the $R_{sd}$ available paths between source s and destination d, given by $$\frac{1}{R_{sd}}\sum_{j=1}^{R_{sd}} U_j.$$

Next, a specified function Block($U_{avg}$) is applied to $U_{avg}$ to compute the blocking probability. Specifically, if $U_{avg}$ is the average path utilization, then the call is blocked with a certain probability Block($U_{avg}$). The function Block(.) is determined in advance and statically programmed into the processor 36b logic, and could for example have a form such as:

$$\text{Block}(U_{avg}) = \begin{cases} 0.0, & 0 \le U_{avg} < 0.8; \\ 0.25, & 0.8 \le U_{avg} < 0.9, \\ 0.5, & 0.9 \le U_{avg} < U_{max}; \\ 1.0, & U_{avg} \ge U_{max} \end{cases}$$

In other words, if the average path is between zero and 80% capacity, the call blocking probability function returns a zero value indicating the admissibility of all calls. If the average path is between 80% and 90% capacity, the call blocking probability function returns a 0.25 value signifying that 25%. of the incoming calls should be blocked. If the path is between 90% capacity and the threshold capacity $U_{max}$, the call blocking probability function returns a 0.50 value indicating that only half of the incoming calls should be admitted. And to complete the example, if the path is over the threshold capacity $U_{max}$, the call blocking probability function returns a value of 1.0 signifying that all calls should be blocked. Note that the objective of such a statistical blocking function (rather than admitting all calls indiscriminately till all paths are saturated) is to allow graceful traffic throttling and prevent potential oscillatory behavior, especially when the update interval is not small enough. Computation of the average path utilization and its mapping into the call blocking probability as described above is implemented by step 254 in FIG. 9. To obtain the conditional selection probabilities, the processor 36B first calculates the residual utilization of each path r available from source s to destination d, given by max{0, $U_{max}$−$U_r$} where $U_{max}$ denotes the allowable peak utilization of any link (or path). The maximization operation is to ensure that the computed residual utilization is never negative; if a path occupancy is greater than or equal to the allowable threshold $U_{max}$, then its residual capacity is identically zero. Next, the conditional selection probability $\hat{p}_r$ for each path r is selected proportional to its residual utilization according to the following rule:

If $$\sum_{j=1}^{R_{sd}} \max\{0, U_{max} - U_j\} = 0, \text{ set } \hat{p}_r = 0, \ r = 1, \ldots, R_{sd}$$

Else, set $$\hat{p}_r = \frac{\max\{0, U_{max} - U_i\}}{\sum_{j=1}^{R_{sd}} \max\{0, U_{max} - U_j\}}, \ r = 1, \ldots, R_{sd}.$$

In other words, if the sum of residual utilizations over all paths is zero, then it indicates that every available path is at, or exceeds, the utilization threshold $U_{max}$. Accordingly, the conditional probability of selecting any path is set to zero or $\hat{p}_r$=0 for all the $R_{sd}$ path choices because the source-destination pair is blocked. If this is not the case, the processor 36b calculates the conditional probability $\hat{p}_r$ for each path r between the source and destination in question by dividing its residual utilization by the sum of residual utilizations over all available paths. This strategy is adopted to encourage utilization of under-utilized paths over those that are over-utilized. Calculation of the conditional path selection probabilities {$\hat{p}_r$} as described above is carried out in step 256 of FIG. 9.

Finally, the unconditional path selection probability of each path r, denoted by $p_r$, is calculated by multiplying the corresponding conditional probability $\hat{p}_r$ computed in step 256 and the probability of call admission given by subtracting the probability of blocking Block($U_{avg}$) computed in step 254 from 1. In equation form this computation is given by $p_r$=$\hat{p}_r$×(1−Block($U_{avg}$)), and is implemented by step 257 in FIG. 9. The interpretation of the set of parameters {$p_r$} thus computed for a given source node s and destination node d is that an incoming call from s to d should be blocked with probability 1−$\sum_{r=1}^{R_{sd}} p_r$, and admitted on path r with probability $p_r$.

The selection probabilities are stored in the "Sel-prob" fields 54a in the PATHS table 54 (FIG. 2), and the algorithm loops back as seen in step 260, until the selection probabilities for all source-destination pairs in the domain are calculated.

The CCDB 36 sends the decision variables {$p_r$} in a set of decision update messages to the gatekeepers as seen in step 262. The decision update message sent to each gatekeeper is of the form, {(PIN, Sel-prob)}, with one data item corresponding to each path that either originates or terminates at an edge router 42 that interfaces with one or more voice gateways 24 managed by the gatekeeper 132 in question. Upon receipt of the decision update message, each gatekeeper 132 copies each received data item (PIN, Sel-prob) into the corresponding local "Sel-prob" variable in its satellite database 136 by using the array index PIN. Until the next decision update message is received from CCDB 36, the gatekeeper 132 locally looks up the relevant "Sel-prob" fields, upon each new call arrival between a given source-destination pair. As is clear from the above discussion, an arriving call is blocked with probability $1-\Sigma p_r$, and admitted on path r with probability $p_r$.

Referring back to FIG. 7, the embodiments above have not specifically addressed updating the LINK cost metric fields in the CCDB as seen in step 200. Two embodiments are presented below to more fully describe a gatekeeper 132 initiated (i.e., accounting-based) system and a system initiated at the IP router 42 level (i.e., measurement-based).

Figure 10:
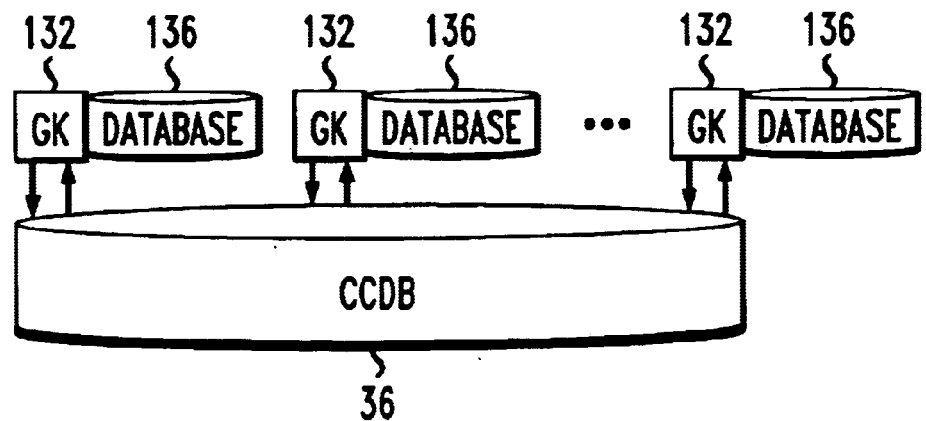
FIG. 10 is a graphical depiction of one embodiment to update the database according to the inexact variant of the present invention shown in FIG. 7.

The flow of information in the gatekeeper-initiated update approach is illustrated in FIG. 10. With this update system, each gatekeeper 132 tracks the bandwidth usage of the various MPLS paths due to calls that it admits. This is tracked in the Bw-usage fields 154b of the PATHS table 154 (FIG. 6) within the satellite database 136. In particular, whenever a gatekeeper 132 admits a call of bandwidth requirement B, this is added to the Bw-usage fields 154b corresponding to the PIN's of the forward and reverse paths assigned to the call. Similarly, whenever a call terminates, the gatekeeper 132 subtracts the bandwidth it had occupied from the Bw-usage fields 154b corresponding to the PIN's of the forward and reverse paths that had carried the call. In this sense, the satellite database 136 updates occur on a per-call basis; however, no complex computations or manipulations are needed, as in the case of the exact algorithm discussed earlier.

During each update interval of duration T, each gatekeeper 132 sends a status update message to the CCDB 36. This message is of the form {[PIN, Bw-usage]}, which is essentially a copy of the Bw-usage column 154b of the PATHS table 154 (FIG. 6) in its satellite database 136. The CCDB 36 writes the status update message received from each gatekeeper 132 into a buffer assigned to that gatekeeper. The buffer allows graceful degradation in the event of the loss of a status update message, in the sense that the update message from the previous update cycle, albeit a little outdated, could still be used to perform the update calculations. At the end of the update interval, the CCDB 36 first resets all the LINKS table 56 Metric field entries 56B to zero. It then processes each data item in the most recent status update message received from each gatekeeper 132 in sequence. For each data item of the form [PIN, Bw-usage], the CCDB identifies each affected link 1 by looking up the PATHS and LINKS tables 54, 56 (recall that the former can be directly indexed by the PIN) and adds [Bw-usage/Capacity l] to Metric l 56b.

Once all the data items from all the gatekeepers 132 have been processed, the Metric field 56b corresponding to each link should provide the most recent estimate of its utilization. The CCDB processor 36b can now proceed with steps 202 and 204 (FIG. 7) of the inexact algorithm described above for the current update cycle.

Figure 11:
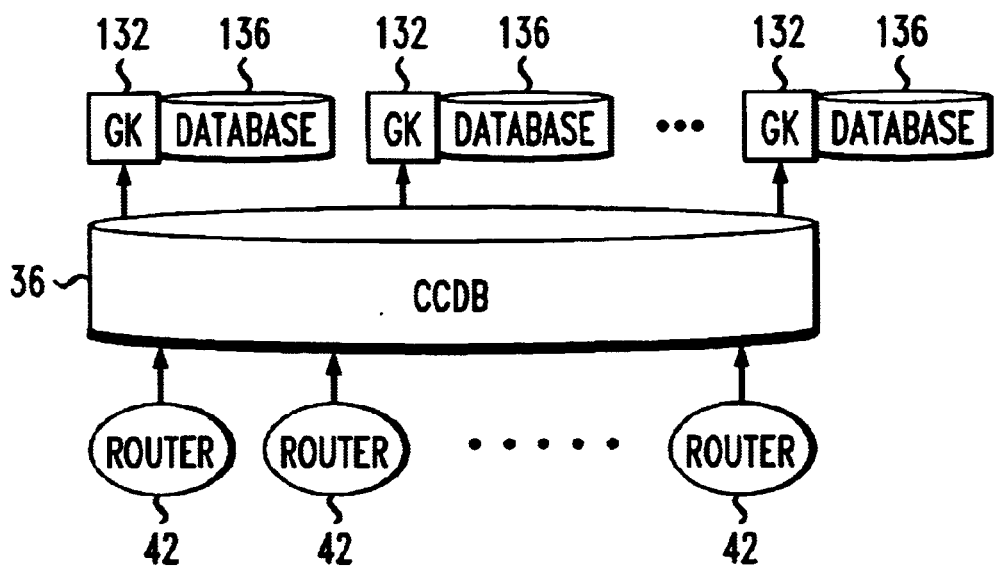
FIG. 11 is a graphical depiction of another embodiment to update the database according to the inexact variant of the present invention shown in FIG. 7.

The flow of information in the measurement-based usage status update model is illustrated in FIG. 11. With the measurement-based system, the gatekeepers 132 are not involved in the link status updates at the CCDB 36. Thus the Bw-usage column 154b in the PATHS table of the satellite databases can be eliminated. Status update is accomplished instead by traffic measurement reports sent by each IP router 42, 42', once every T seconds. The report from a specific router 42, 42' will include a data item in the form [flinkid, voice-count], corresponding to each link emanating from it. Linkid provides the identity of the link in a form that the CCDB 36 can interpret, and voice-count provides a bit count corresponding to the Diffserv priority class assigned to voice on the link in question. Upon receipt of a status update message, CCDB 36 looks up the LINKS table 56 (FIG. 6) for an entry indexed by each linkid in the received message, and writes [voice-count/(T×Capacity(linkid))] into the corresponding Metric field 56b, where T as may be recalled is the duration of the update cycle. Again, a buffering strategy is applied to the update messages from each router, as in the case of the accounting-based update system, to allow graceful degradation in the event of the loss of update messages. Once all the LINKS table entries are updated, the CCDB processor 36b can proceed with steps 202 and 204 (FIG. 7) of the inexact algorithm described above for the current update cycle.

The simplicity of the measurement-based approach compared to the gatekeeper-initiated approach may readily be appreciated. There is no need to perform per-call updates within the satellite databases, or to perform the aggregation operations within the CCDB mentioned above for every update cycle.

One advantage with the measurement-based usage status update is that it can facilitate greater distribution of implementation. In particular, all the CAC and LB calculations can be fully distributed among the gatekeepers 132, with a few modifications. With the latter strategy, the CCDB 36 merely functions as a management module that collects the link status updates from the IP routers 42 every T seconds, and simply forwards them to the gatekeepers 132. Each gatekeeper (or an adjunct module) replicates the full-fledged CCDB database 36b structure shown in FIG. 2 within its satellite database, instead of the limited version shown in FIG. 6 for the centralized inexact schemes presented above. Upon receipt of the link updates forwarded by the CCDB 36 during an update cycle, each gatekeeper 36 writes them into the local copy of the LINKS table within its satellite database. It then proceeds with the execution of step 202 (FIG. 7) of the inexact algorithm to generate the decision variables as described earlier. This is carried out either based on the deterministic variant or on the probabilistic variant; the resulting decision variables are stored either in the "Opt-path" column or in the "Sel-prob" column of the enhanced satellite database, to be used to make admission control and load balancing decisions during call arrivals over the current update cycle. Note that step 204 in the flowchart shown in FIG. 7 is absent in the distributed model since there is no need to disseminate the admission control decisions computed locally at each gatekeeper. The advantage with the distributed approach is that the computational burden on each gatekeeper 132 is less than on the CCDB 36 in the centralized mode, by a factor of K, where K is the number of gatekeepers in the administrative domain. This is due to the fact that each gatekeeper 132 deals with N(N–1)/K source-destination pairs on the average. A second advantage is the superior robustness, since the failure of the control functions at one gatekeeper 132 affects only those voice gateways that it manages, whereas the failure of CCDB 36 in the centralized mode can affect the whole network domain.

Those skilled in the art can appreciate that ptions exist to adapt the connection admission control capability of the embodiments presented to the special case where network routing is based on the widely available Open Shortest Path First (OSPF) routing standard (rather than being limited to MPLS). However, OSPF does not allow setting up explicit paths; hence the flexibility to set up multiple explicit routes with spatial diversity between pairs of nodes does not exist. Therefore the load balancing (LB) capability cannot be extended to networks that employ OSPF-based routing.

Figure 12:
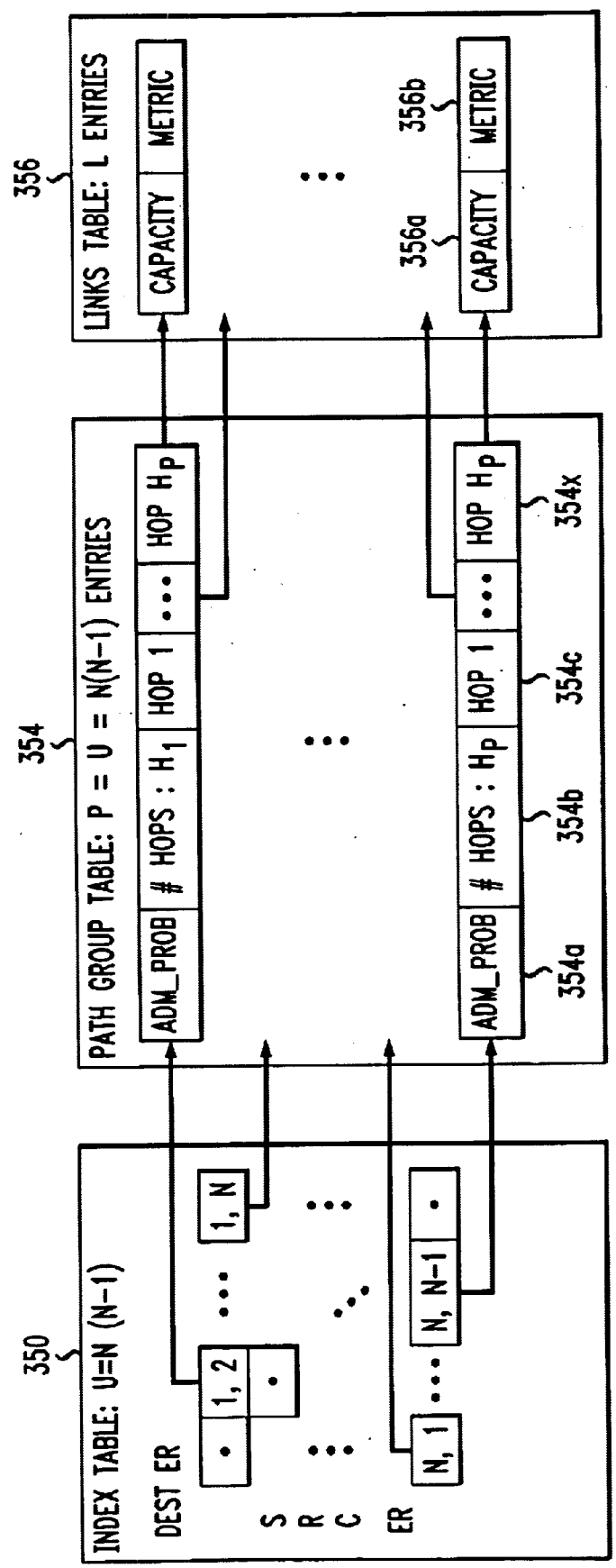
FIG. 12 shows a specialized embodiment of the set of data tables shown in FIG. 1, for adapting the current invention to work in conjunction with a widely used form of network routing.
Figure 13:
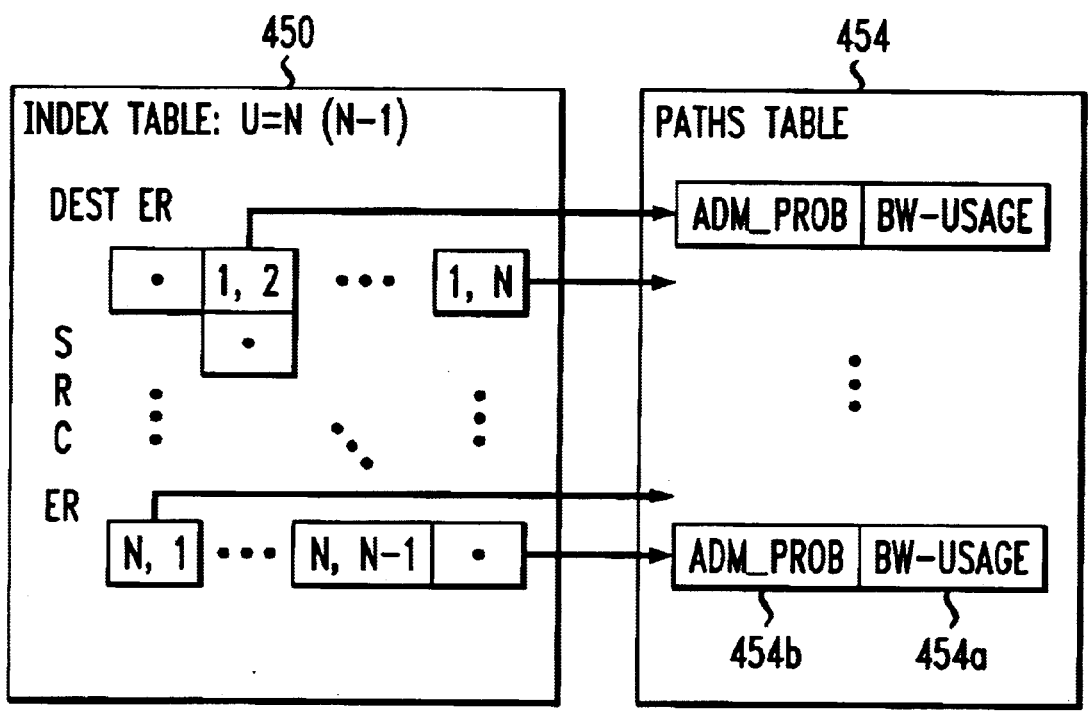
FIG. 13 shows a specialized embodiment of the set of data tables within the satellite database of FIG. 5, for adapting the current invention to work in conjunction with a widely used form of network routing.

Absence of the load balancing option in the OSPF context implies that a PATH GROUP table 52 (FIG. 2) would become unnecessary in the CCDB 36 (FIGS. 1, 5). In that case, each entry in the INDEX table 50 could provide the PIN of the corresponding unique routing path as selected by the OSPF algorithm. The PIN would refer to an entry in the PATHS table 254 (FIG. 12) which should now have only P=U=N(N−1) entries altogether. As before, each PATHS table entry provides references to a set of entries in the LINKS table, which correspond to the network links chosen by the OSPF algorithm to route the path in question. The reduced structure of the CCDB applicable to the OSPF context is shown in FIG. 12. Along similar lines, the generic version of the satellite database shown in FIG. 6 can be modified to the reduced version shown in FIG. 13, to be used in conjunction with OSPF routing.

Figure 14:
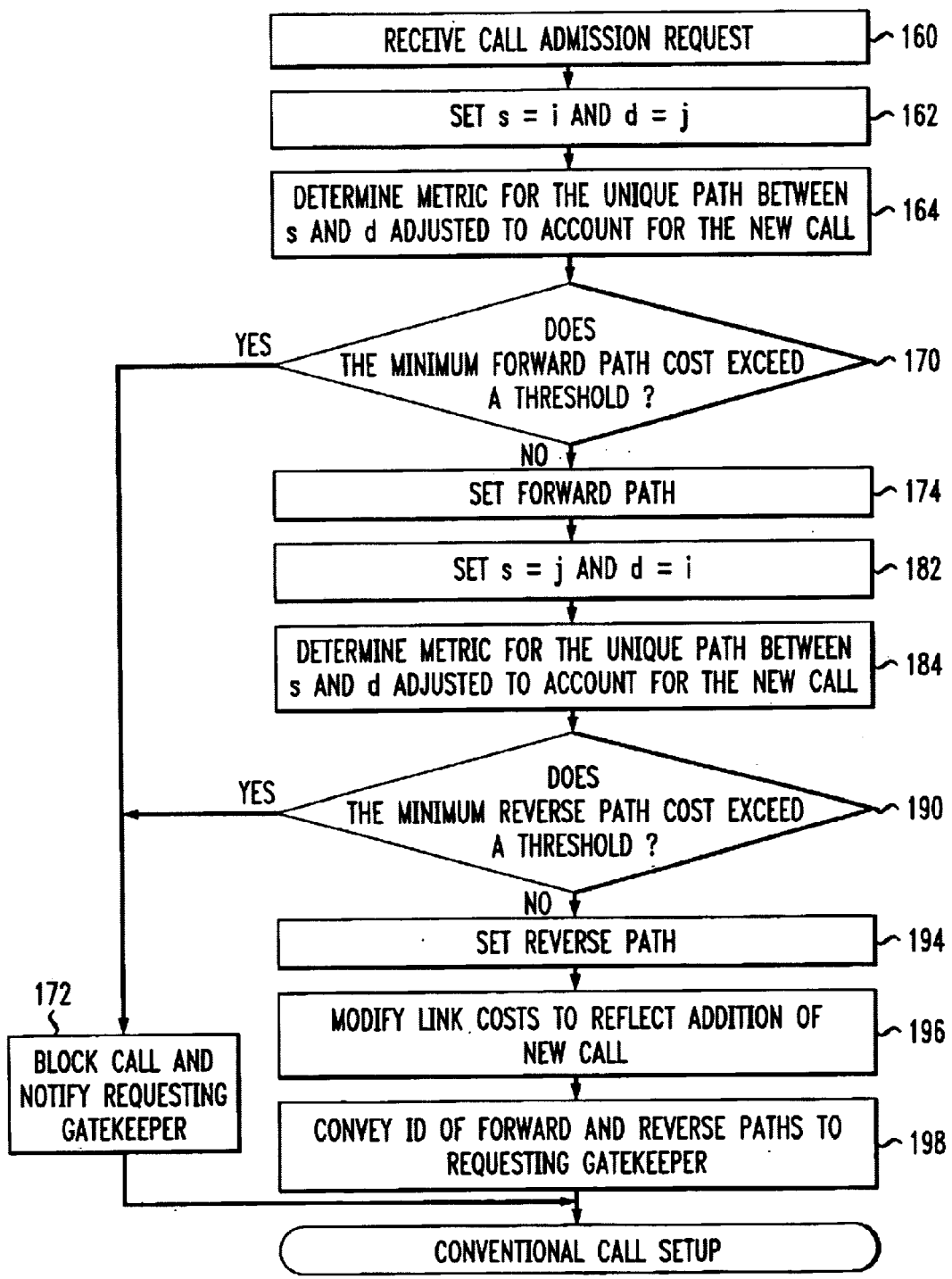
FIG. 14 is a specialized embodiment of the flowchart in FIG. 3, for adapting the current invention to work in conjunction with a widely used form of network routing; and, FIG. 15 is a specialized embodiment of the flowchart given in FIG. 9, for adapting the current invention to work in conjunction with a widely used form of network routing.

Without load balancing, the algorithms shown in FIGS. 3, 8 and 9 would be simplified when adapted to an OSPF-based network. The version of the exact algorithm applicable to OSPF is shown in FIG. 14. The key difference from the generic version in FIG. 3 is the absence of steps analogous to steps 66 and 86 (FIG. 3), since there is no path selection in the OSPF scenario; all that is needed is to determine if the unique path has enough residual bandwidth to admit the new call. With the load balancing capability removed, the distinction between the deterministic form of the inexact scheme shown in FIG. 8 and the probabilistic version shown in FIG. 9 also blur.

In FIG. 15 we show a modified version of the probabilistic inexact algorithm applicable to the OSPF context. As may be noted, steps analogous to steps 256 and 257 (FIG. 9) from the generic version are absent in the OSPF-specific version. In the latter case, a path utilization metric U is computed for the unique path between a source and destination pair, and mapped into an admission probability. For the latter, a suitably chosen blocking function Block(U) is subtracted from 1 and stored in the Adm_prob field 354a of the CCOB (FIG. 12) and disseminated to the gatekeepers where they are stored in the respective reduced satellite databases. Upon each call arrival during the current update cycle, the call is admitted on the unique path with probability Adm_prob and blocked with probability 1−Adm_prob. Note that in the absence of load balancing, the deterministic variant of the inexact algorithm degenerates to the special case of the probabilistic variant corresponding to the blocking function: Block(U)=0.0, U<$U_{max}$; 1.0, U≧$U_{max}$.

The only remaining step to implement the CAC capability in conjunction with OSPF is providing the means to infer the routes autonomously selected by OSPF. Those skilled in the art will appreciate that unlike in the case of MPLS one cannot externally influence the routing decisions made by OSPF.

Several embodiments exist to extract the routing information in an OSPF domain. One is to collect the routing table entries at the transit routers 42', which correspond to the (limited number of) destination edge routers 42 terminating voice. A second option would be to program the traffic monitors at the routers 42' (FIGS. 1, 5) to randomly sample the transiting voice packets (distinguishable, for example, by the Diffserv-Code-Point (DSCP) field) on each link, and record the distinct source-destination address pairs that it encounters. The information generated by either mechanism can be sent to a central location that can interpret the data, e.g., the CCDB 36. The collection and reporting of the data for inferring routes can be done at a much slower time scale (e.g., once in 15 minutes), compared to the real-time CAC and LB control actions discussed here.

With the first strategy above, one may map each pair of source and destination NIN's to the corresponding IP addresses, and the respective chain of routing table segments collected may be traced to identify all the links in the path. These may then be programmed into the PATHS table 354 (FIG. 12). With the second approach, each data item reported by a router 42 (FIGS. 1, 5)will indicate a source node IP address, a destination node IP address, and the identity of a network link. The two IP addresses may be used first to look up a "reverse map" and identify the corresponding source and destination NIN's. These indices can be used to locate the particular entry in the PATHS table 354 corresponding to the specified source-destination pair, and the network link indicated by the data item can be added if not already present, by creating a new logical linkage to the respective entry in the LINKS table 356. Also, to be able to track changes in the routing pattern, each link pointer in a PATHS table 354 entry is subject to aging. In other words, unless a fresh data item is received within a specified aging interval to confirm the inclusion of a particular network link in the path (unique, in the OSPF case) for a given source-destination pair, that link is removed from the path. Note that the "reverse map" search indicated above is not particularly burdensome since this will be done relatively infrequently (e.g., once every 15 minutes), and furthermore, since the number of edge routers 42 that terminate voice within a domain would be relatively small (e.g., 100). Finally, a third option to infer routes in the OSPF scenario would be to initiate trace-route messages periodically from every source edge node to every destination edge node, and use the feedback received to update the CCDB entries.

The invention has been described with reference to the preferred embodiments. Modifications and alterations will occur to others upon a reading and-understanding of the preceding detailed description. It is intended that the invention be construed as including all such modifications and alterations insofar as they come within the scope of the appended claims or the equivalents thereof.

Having thus described the preferred embodiments, the invention is now claimed to be:

1. A method of regulating admission of a packet streams to an Internet Protocol (IP) network having a plurality of IP routers with a plurality of links interconnecting them, the method comprising:

responsive to receipt of an admission request, identifying a source gateway and a destination gateway;

updating cost data associated with the network links by performing traffic measurements by traffic class at the IP routers, and reporting the traffic measurements with traffic measurement reports;

from the updated link cost data, determining costs associated with various paths through the network;

selecting a most favored pair of forward and reverse paths between the source gateway and the destination gateway having the minimum cost;

comparing cost data associated with the selected paths and a threshold value; and, based on the comparison, selectively blocking the packet stream.

2. The method as set forth in claim 1, wherein the paths include a set of network links, the method further comprising, at selected times:

storing the determined cost associated with various paths through the network.

3. The method as set forth in claim 2, wherein the updating cost data step comprises for each packet stream admission to, and release from the path, adjusting the cost data associated with the network links in the path to reflect a cost associated with the packet stream.

4. The method as set forth in claim 2, wherein the path includes a plurality of links adapted to discriminate between differing classes of packet streams, and the updating cost data step comprises aggregating link use data for a particular class.

5. The method as set forth in claim 4, wherein the updating cost data step further comprises tracking class based link use data at an admission control point.

6. The method as set forth in claim 1, wherein the selectively blocking step comprises blocking the packet stream based on a variable probability, and where the variable probability is a function of the cost data associated with the selected paths.

7. The method as set forth in claim 1, wherein a plurality of paths exist between the source and the destination, and the selectively blocking step comprises blocking the packet stream when cost data associated with each of the plurality of paths exceeds the threshold value.

8. The method as set forth in claim 1, where the updating step including performing traffic measurements by traffic class comprises providing a bit count corresponding to the traffic assigned to voice on the links emanating from the associated IP router, thereby distinguishing traffic assigned to voice from traffic not assigned to voice.

9. The method as set forth in claim 8 wherein the updating step comprises using Diffserv to distinguish traffic assigned to voice from traffic not assigned to voice.

10. The method as set forth in claim 9 wherein the reporting step comprises:

identifying the links emanating from the router performing the traffic measurement; and providing a bit count for the traffic assigned to voice for the identified links.

11. A method of regulating admission of a packet streams to an Internet Protocol (IP) network having a plurality of IP routers with a plurality of links interconnecting them, the method comprising:

at selected times, updating cost data for network links associated with the IP routers by performing traffic measurements by traffic class at the IP routers, and reporting the traffic measurements with traffic measurement reports;

computing an admission decision based on the cost data for a path through the network between a source and a destination including selected network links; and, applying the admission decision responsive to a packet stream admission request.

12. The method as set forth in claim 11, where the computing step comprises:

determining a path between a source and a destination having a minimum cost data;

comparing the minimum cost data to a threshold; and, setting a variable indicative of a result of the comparison.

13. The method as set forth in claim 11, where the computing step comprises:

determining a cost factor based on cost data for each path between a source and a destination;

determining a probability that a particular path will be selected, where the probability is based on the cost factor and the cost data of each path; and setting a variable indicative of the determined probability.

14. The method as set forth in claim 11, wherein the updating cost data step comprises adjusting the cost data for the network links comprising the path upon each packet stream admission and release.

15. The method as set forth in claim 11, wherein the computing step comprises:

at a central location, computing an admission decision for at least one path through the network; and forwarding the computed admission decision to a satellite location enabling decentralized admission control decisions.

16. The method as set forth in claim 11, where the network links include a plurality of links interconnecting routers, and the updating cost data step comprises measuring link usage at the routers.

17. The method as set forth in claim 11, where the path includes a plurality of links adapted to discriminate between classes of packet streams, and the updating cost data step comprises determining cost data by class.

18. The method as set forth in claim 17, wherein the updating cost data step further comprises tracking path use data at an admission control point.

* * * * *